(12) United States Patent
Kim et al.

(10) Patent No.: US 10,287,497 B2
(45) Date of Patent: May 14, 2019

(54) QUANTUM ROD COMPOUND INCLUDING ELECTRON ACCEPTOR AND QUANTUM ROD LUMINESCENT DISPLAY DEVICE INCLUDING THE SAME

(71) Applicant: LG DISPLAY CO., LTD., Seoul (KR)

(72) Inventors: Kyu-Nam Kim, Paju-si (KR); Jin-Wuk Kim, Goyang-si (KR); Byung-Geol Kim, Paju-si (KR); Sung-Woo Kim, Paju-si (KR); Kyung-Kook Jang, Paju-si (KR); Hee-Yeol Kim, Incheon (KR); Sung-Il Woo, Daejeon (KR)

(73) Assignee: LG DISPLAY CO., LTD., Seoul (KR)

( * ) Notice: Subject to any disclaimer, the term of this patent is extended or adjusted under 35 U.S.C. 154(b) by 450 days.

(21) Appl. No.: 14/956,051

(22) Filed: Dec. 1, 2015

(65) Prior Publication Data

US 2016/0075943 A1  Mar. 17, 2016

Related U.S. Application Data

(62) Division of application No. 14/552,028, filed on Nov. 24, 2014, now Pat. No. 9,228,717.

(30) Foreign Application Priority Data

Nov. 28, 2013 (KR) .......................... 10-2013-0146279
Nov. 18, 2014 (KR) .......................... 10-2014-0160563

(51) Int. Cl.
*C09K 11/88* (2006.01)
*F21V 9/14* (2006.01)
(Continued)

(52) U.S. Cl.
CPC .............. *C09K 11/883* (2013.01); *F21V 9/14* (2013.01); *G02B 6/0056* (2013.01); *G02F 2/02* (2013.01);
(Continued)

(58) Field of Classification Search
CPC combination set(s) only.
See application file for complete search history.

(56) References Cited

U.S. PATENT DOCUMENTS

2001/0002855 A1\* 6/2001 Onisawa ............. G02F 1/13458
  349/43
2004/0118448 A1\* 6/2004 Scher ..................... B82Y 10/00
  136/252

(Continued)

FOREIGN PATENT DOCUMENTS

CN  101842460 A  9/2010
CN  103091892 A  5/2013

*Primary Examiner* — Anthony J Frost
(74) *Attorney, Agent, or Firm* — Dentons US LLP

(57) ABSTRACT

A quantum rod luminescent display device includes a first substrate having a plurality of pixel regions; a plurality of first electrodes alternately arranged with a plurality of second electrodes in each of the plurality of pixel regions; a plurality of quantum rod compound layers over the first electrodes and the second electrodes, respectively in each of the plurality of pixel regions, each of the quantum rod compound layers including a quantum rod having a core, a shell surrounding the core, and an electron acceptor; a second substrate facing the first substrate; and a backlight unit at an outer surface of the first substrate. The electron acceptor is attached to or adjacent to the quantum rod.

8 Claims, 8 Drawing Sheets

(51) Int. Cl.
*F21V 8/00* (2006.01)
*G02F 2/02* (2006.01)
*B82Y 20/00* (2011.01)

(52) U.S. Cl.
CPC ............ *B82Y 20/00* (2013.01); *Y10S 977/762* (2013.01); *Y10S 977/95* (2013.01)

(56) References Cited

U.S. PATENT DOCUMENTS

| | | | |
|---|---|---|---|
| 2007/0160521 A1* | 7/2007 | Winkler | C04B 35/524 423/445 R |
| 2007/0176824 A1* | 8/2007 | Stumbo | H01Q 3/34 342/372 |
| 2009/0034056 A1 | 2/2009 | Choi et al. | |
| 2009/0109435 A1 | 4/2009 | Kahen et al. | |
| 2010/0289001 A1 | 11/2010 | Kahen et al. | |
| 2011/0089809 A1* | 4/2011 | Noh | B82Y 20/00 313/483 |

\* cited by examiner

QUANTUM ROD COMPOUND INCLUDING ELECTRON ACCEPTOR AND QUANTUM ROD LUMINESCENT DISPLAY DEVICE INCLUDING THE SAME

This application is a divisional of Application No. 14/552,028 filed Nov. 24, 2014, which claims the priority benefit of Korean Patent Applications No. 10-2013-0146279, filed in the Republic of Korea on Nov. 28, 2013 and No. 10-2014-0160563, filed in the Republic of Korea on Nov. 18, 2014, which are incorporated by reference in their entirety for all purposes as if fully set forth herein.

BACKGROUND

Field of the Disclosure

The present disclosure relates to a quantum rod compound and a quantum rod luminescent display device including the same, and more particularly, to a quantum rod compound and a quantum rod luminescent display device including the same that is capable of improving a quantum yield, on/off driving of applying a voltage and no voltage, and color purity.

Discussion of the Related Art

Recently, flat panel displays haven been widely developed and applied to various fields because of their thin profile, light weight, and low power consumption.

Liquid crystal display devices have been widely used as representative flat panel displays.

Referring to FIG. 1, which is a cross-sectional view schematically illustrating a liquid crystal display device according to a related art, a liquid crystal display device 1 includes a liquid crystal panel 3, which comprises first and second substrates (not shown), a color filter layer (not shown) and a liquid crystal layer (not shown), a backlight unit 7, which comprises a plurality of optical sheets 5, and upper and lower polarizers 9 and 11.

Specifically, the liquid crystal display device 1 includes the liquid crystal layer (not shown), requires the optical films 52 and the polarizers 9 and 11 for embodying gray levels, and needs the color filter layer in the liquid crystal panel 3 for expressing colors.

Therefore, in the liquid crystal display device 1, light transmittance is lowered because most of light emitted from a light source (not shown) of the backlight unit 7 is blocked or absorbed when the light passes through the optical sheets 5, the color filter layer (not shown), and the polarizers 9 and 11.

That is to say, if the amount of light emitted from the light source (not shown) of the backlight unit 7 is 100%, the amount of light finally passing through the liquid crystal display device 1 may be 5% to 10%, and the liquid crystal display device 1 may have very low transmission efficiency.

Accordingly, the brightness of the light from the backlight unit 7 should be increased so that the liquid crystal display device 1 has an appropriate brightness for a display device. However, in this case, the liquid crystal display device 1 would have an increase in power consumption. Further, it is difficult to decrease the manufacturing costs of the liquid crystal display device because a lot of elements for manufacturing the liquid crystal display device are needed.

Other flat panel display devices have been researched to solve the low transmittance of the liquid crystal display device 1, to decrease the power consumption, and to lower the manufacturing costs by using fewer components.

In the meantime, organic light emitting diode display devices without the color filter layer and the optical films have been suggested to meet these demands.

An organic light emitting diode display device, which may be referred to as an organic electroluminescent display device, emits light by injecting electrons from a cathode and holes from an anode into an organic light emitting layer, combining the electrons with the holes, generating excitons, and transforming the excitons of an excited state to a ground state to emit photons.

The organic light emitting diode display device has advantages because it is able to use a flexible substrate such as plastic as a base substrate, is able to be driven by a relatively low voltage as compared to the liquid crystal display device, is superior in color representation due to self-luminescence, and is lower in power consumption.

However, the organic light emitting diode display device has a problem that its lifetime is shorter than a liquid display device because organic luminous materials of organic light emitting layers emitting various colors have different lifetimes. Especially, a blue luminous material has a relatively short lifetime.

Therefore, a flat panel display device, which has high transmittance, low power consumption, and a lifetime as long as the liquid crystal display device, is required.

Recently, quantum dots or quantum rods have been applied and developed to use in the display devices. Quantum dots or quantum rods have many possible applications due to their high luminous efficiency and superior reproducibility. A quantum dot is a semiconductor nanocrystal that can emit a narrow band of light when energized. A quantum rod is a nanocrystal with a rod-like shape.

The wavelength of fluorescence radiation emitted from a quantum dot or a quantum rod depends on its size. Namely, the quantum dot or the quantum rod emits shorter wavelength fluorescent radiation as its size is smaller. Thus, by changing the size, the quantum dot or the quantum rod can emit almost all visible wavelengths.

Also, the fluorescent radiation from the quantum rod may have a polarization property. Therefore, a display device using the quantum rod has a polarization property without a polarizer. Since the display device does not need a polarizer, there is no problem with light transmission associated with added polarizers, and the brightness of the display device is improved. Moreover, the power consumption is decreased because there is no need to increase backlight output.

In addition, the display device using the quantum rod has an advantage of an increase in its lifetime compared to an organic light emitting diode display device, which includes different organic luminous materials for respective colors and has a relatively short lifetime because the organic luminous materials have different lifetimes and properties.

However, the display device using the quantum rod has a problem of needing a high driving voltage for driving the quantum rod as compared with the liquid crystal display device and the organic light emitting diode display device.

That is, in a display device using the quantum rod, improvements in an on/off driving property and lower driving voltage are needed.

SUMMARY

Accordingly, the disclosure is directed to an array substrate including a quantum rod compound and a quantum rod luminescent display device including the same that substantially obviate one or more of the problems due to limitations and disadvantages of the related art.

An object of the disclosure is to provide a quantum rod compound and a quantum rod luminescent display device including the same that is capable of improving a quantum yield, an on/off driving property, and color purity.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the disclosure, as embodied and broadly described, a quantum rod luminescent display device may, for example include a first substrate having a plurality of pixel regions; a plurality of first electrodes alternately arranged with a plurality of second electrodes in each of the plurality of pixel regions; a plurality of quantum rod compound layers, one each over the plurality of first electrodes and the plurality of second electrodes, respectively in each of the plurality of pixel regions, each of the quantum rod compound layers including a quantum rod with a core and a shell surrounding the core, and an electron acceptor; a second substrate facing the first substrate; and a backlight unit at an outer surface of the first substrate.

In another aspect, a quantum rod compound includes a quantum rod with a core and a shell surrounding the core; an electron acceptor attached to a surface of the quantum rod or adjacent to the quantum rod; and a solvent.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the invention.

DETAILED DESCRIPTION OF THE ILLUSTRATED EMBODIMENTS

Reference will now be made in detail to embodiments of the invention, examples of which are illustrated in the accompanying drawings. Wherever possible, similar reference numbers will be used to refer to the same or similar parts.

A quantum rod includes a core and a shell surrounding the core and is a fluorescent material that emits light when an excited electron transits from a conduction band to a valence band.

The quantum rod has an extinction coefficient 100 to 1000 times larger and a quantum yield higher than common dyes. Thus, the quantum rod emits fluorescent radiation, and a wavelength of visible light emitted by the quantum rod can be controlled by adjusting a diameter of the quantum rod.

Figure 1:
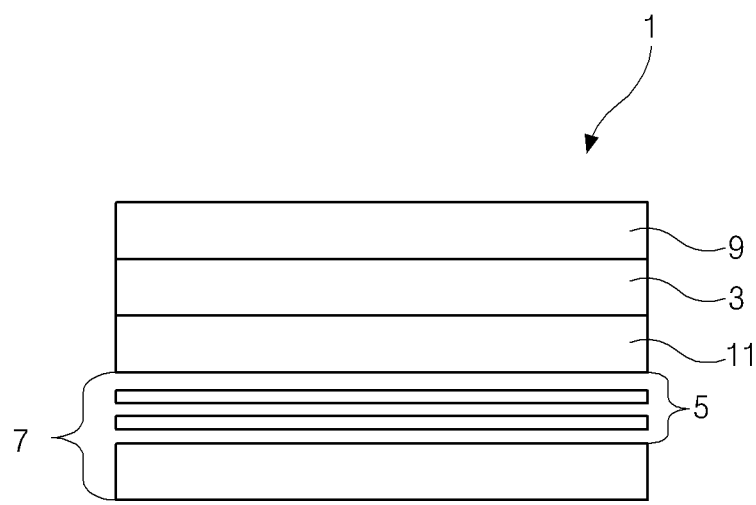
FIG. 1 is a cross-sectional view schematically illustrating a liquid crystal display device according to a related art.
Figure 2:
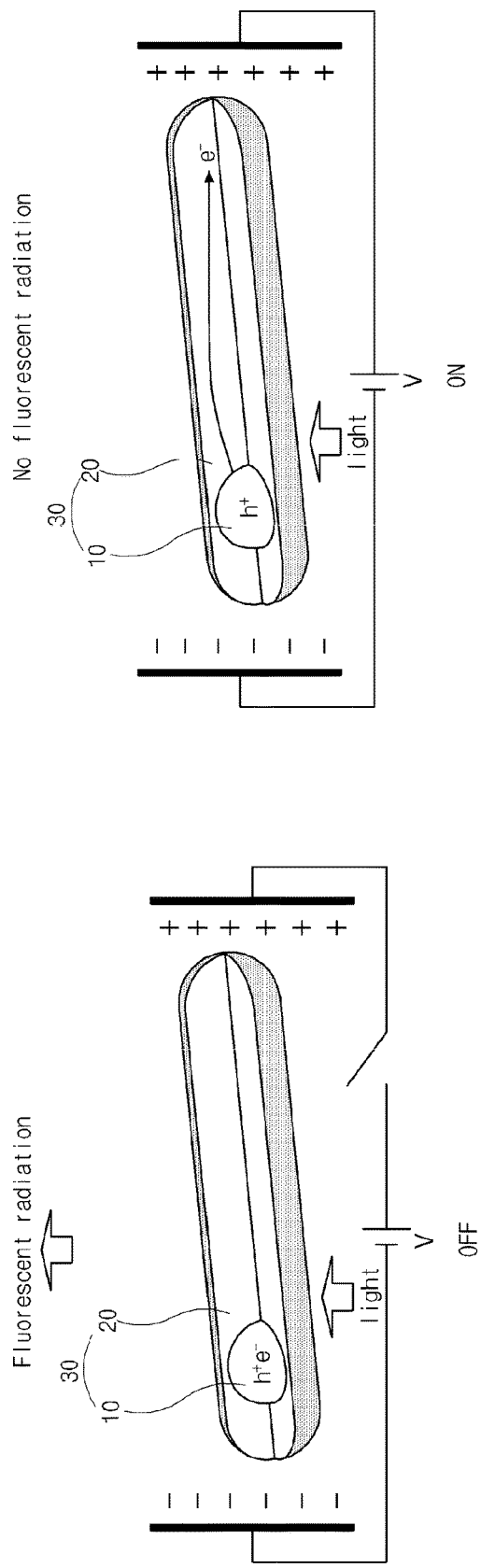
FIG. 2 is a view illustrating exemplary luminous characteristics of a quantum rod when a voltage is not applied and is applied.

The quantum rod emits linearly polarized light regardless of an irradiating light source. Referring to FIG. 2, which is a view illustrating exemplary luminous characteristics of a quantum rod when a voltage is not applied and when a voltage is applied. When an electric field is applied to the quantum rod 30, due to a stark effect by applying a voltage, an electron e− and a hole h+ are separated, and the quantum rod 30 has an optical property such that luminescence can be controlled.

When a voltage is not applied, that is, in a state of 0V, the electron e− and the hole h+ are located in the core 10 of the quantum rod 30, and the quantum rod 30 has a luminous property. Then, when light from a light source is provided to the quantum rod 30, the quantum rod 30 absorbs the light, and the quantum rod 30 fluoresces in a wavelength range. On the other hand, when a voltage is applied, the electron e− moves from the core 10 to the shell 20, and a distance between the electron e− and the hole h+ increases. The quantum rod 30 loses the luminous property, and there is no fluorescence.

Therefore, there is an advantage of improving light efficiency of a display device by using the above-mentioned property of the quantum rod 30.

More particularly, as stated above, the quantum rod 30 is driven by an on/off driving method according to presence and absence of a voltage, more precisely, an electric field.

When the electric field is applied, the electron e− moves from the core 10 to the shell 20 after the hole h+ and the electron e− are separated from each other, and caused an extinction of an exciton. Thus, the quantum rod 30 does not fluoresce, thereby not producing light. When the electric field is not applied, the quantum rod 30 normally fluoresces.

It is noted that the quantum rod 30 affects the quantum yield and the mobility of electric charges due to the above-mentioned structural feature.

Meanwhile, the shell 20 of the quantum rod 30 has different optical properties according to a physical length of its major axis.

Figure 3:
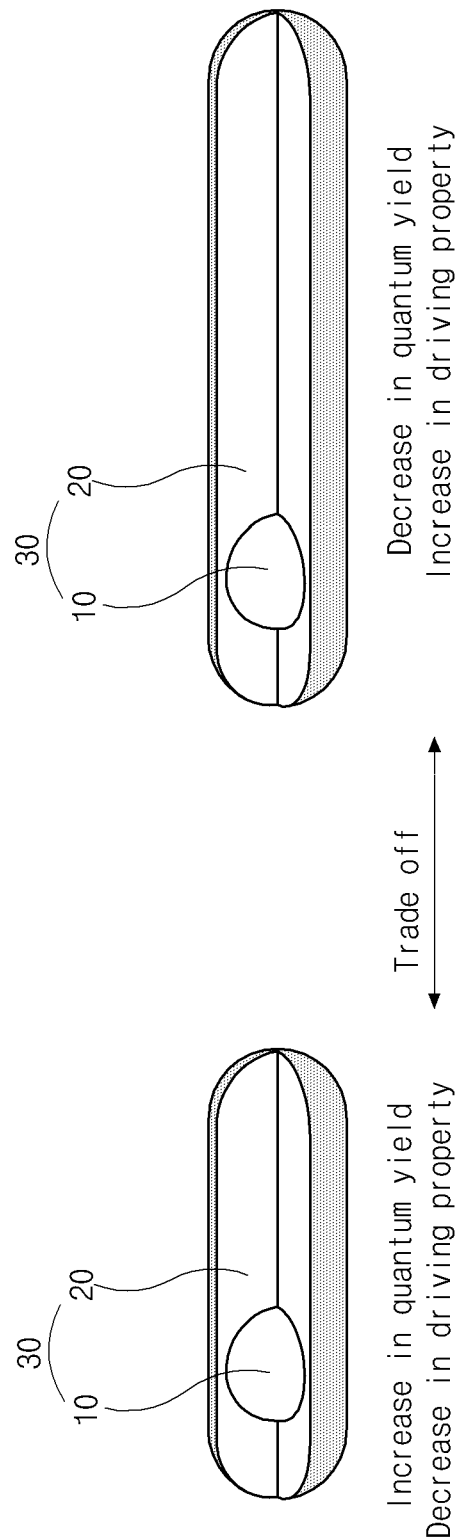
FIG. 3 is a view schematically illustrating an exemplary relation between the quantum yield of the quantum rod and the on/off driving property.

Referring to FIG. 3, which is a view schematically illustrating an exemplary relation between the quantum yield QY of the quantum rod 30 and the on/off driving property. The longer the length of the major axis of the shell 20, the lower the quantum yield QY becomes. On the other hand, the shorter the length of the major axis, the higher the quantum yield QY becomes, and the lower the on/off driving property becomes, thereby causing a trade-off therebetween.

Accordingly, when the length of the major axis of the shell 20 becomes longer, the quantum yield QY is lowered, and the brightness of the display device including the quantum rod 30 decreases. In addition, color purity is lowered due to interference between energy band-gaps of the core 10 and the shell 20 as the length of the major axis of the shell 20 gets longer, and the optical properties of the quantum rod 30 are lowered. Moreover, the longer the length of the major axis of the shell 20 becomes, the higher the driving voltage of the quantum rod 30 becomes.

To solve the above-mentioned problem regarding the quantum rod, the length of the major axis of the shell 20 may be shorter. However, the quantum yield QY and the color purity may be improved, and the on/off driving property is lowered. Thus, although a voltage is applied, an off state is not completely maintained, and there is light leakage, thereby lowering the contrast ratio of a display.

Accordingly, to implement a quantum rod luminescent display device using the quantum rod 30 having these properties, it is required that the quantum rod 30 has properties of improving the on/off driving property according to presence and absence of the voltage. An increase in the quantum yield QY of the quantum rod 30 to further increasing the color purity is needed.

Hereinafter, a quantum rod, a method of forming the same, and a quantum rod luminescent display device according to an embodiment of the invention, which overcome the above-mentioned problems, will be described.

Figure 4:
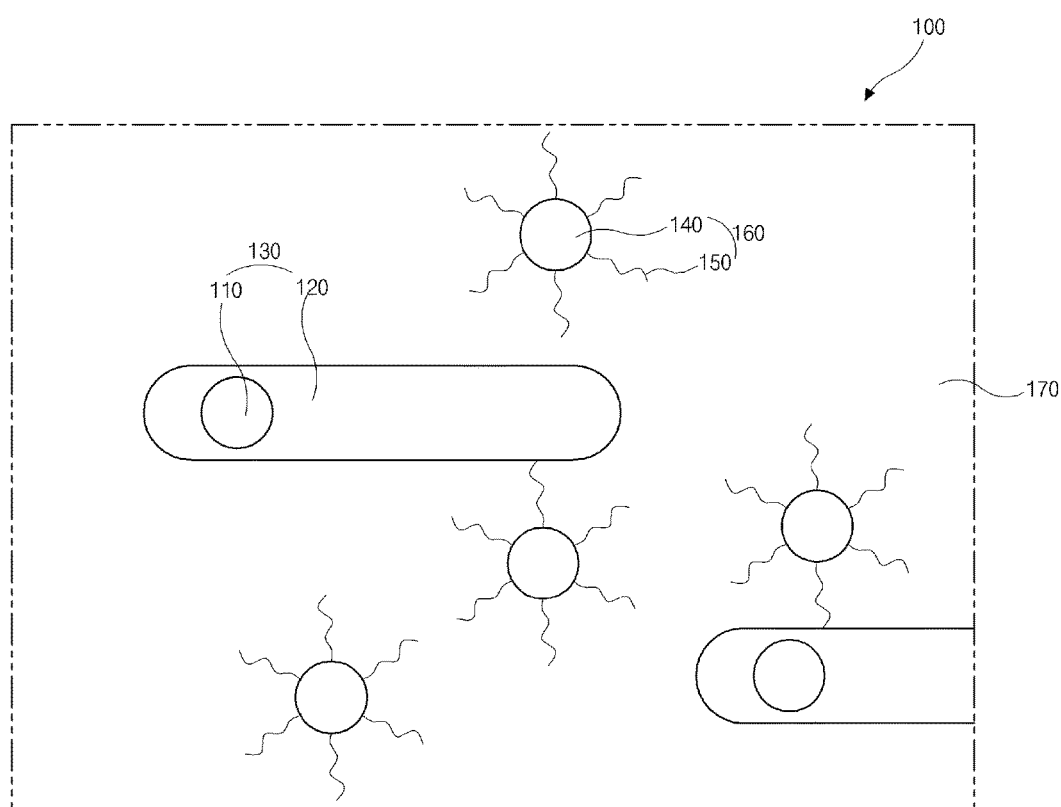
FIG. 4 is a view schematically illustrating a quantum rod compound according to an exemplary embodiment of the invention.

FIG. 4 is a view schematically illustrating a quantum rod compound according to an exemplary embodiment of the invention.

In FIG. 4, the quantum rod compound 100 according to the embodiment includes quantum rods 130, electron acceptors 160, and a solvent 170. Each quantum rod 130 comprises a core 110 as a center and a shell 120 surrounding the core 110, and having a minor axis and a major axis. Each electron acceptor 160 may be attached to a surface of the quantum rod 130 or may be adjacent to the quantum rod 130.

The core 110 of the quantum rod 130 may have a sphere, elliptical, polyhedron, or rod shape. As illustrated, the core 110 has a spherical shape, for example.

The shell 120 of the quantum rod 130 has a rod shape with a major axis and a minor axis. The shell 120 may have a cross-section of a circle, an ellipse, or a polygon along the minor axis.

The shell 120 may have a single-layered or multi-layered structure.

Additionally, the core 110 of the quantum rod 130 includes Group II-VI, III-V, I-III-VI or IV-VI semiconductor materials of the periodic table. For example, the core 110 may include one or more from CdSe, CdS, ZnSe, ZnSeS, CdZnSe, and CdSeS.

The shell 120 may include ZnS or CdS.

The quantum rod 130 may have a length of the major axis within a range of about 5 nm to about 1000 nm. At this time, it is desirable that an aspect ratio (AR) of the major axis to the minor axis of the quantum rod 130 has a value within a range of about 8 to about 12.

According to experiments, when the quantum rod 130 has an aspect ratio smaller than 8, the quantum yield is excellent, and the on/off driving property is lowered. On the other hand, when the quantum rod 130 has an aspect ratio larger than 12, the on/off driving property is superior, and the quantum yield is decreased. It is noted that the quantum rod compound 100 synthesized from the quantum rods 130 having the aspect ratio of 8 to 12 and the electron acceptors 150 has excellent quantum yield and the improved on/off driving property.

Meanwhile, as stated above, the quantum rod compound 100 includes the solvent 170. In solution, the electron acceptors 160 forming a solute with the quantum rods 130 may be attached to the quantum rods 130, more precisely, to surfaces of the shells 120. Optionally, the electron acceptors 160 may be adjacent to the quantum rods 130, and the solute is dispersed.

The solvent 170 may be toluene or ethanol.

In the quantum rod compound 100 according to the embodiment, it is noted that the solute of the quantum rods 130 and the electron acceptors 160, beneficially, is 9 to 11 wt % of a solution composed of the solvent and the solute, and the electron acceptors 160, desirably, are 1 to 10 wt % of the solute.

If the content of the electron acceptors 160 is less than 1 wt % of the solute, an ability to accommodate electrons is decreased because of the low content of the electron acceptors 160, and a length of the shell 120 is reduced. Thus, the on/off driving property is hardly improved. If the content of the electron acceptor 160 is more than 10 wt %, charge accumulation occurs, and the amount of electrons encountering holes is decreased. Therefore, the quantum yield is lowered.

Accordingly, the appropriate content of the electron acceptors 160, beneficially, is 1 to 10 wt % of the solute composed of the quantum rods 130 and the electron acceptors 160 in the quantum rod compound 100 to achieve the objective of the embodiment.

TABLE 1

| Electron acceptor | Off-rate at 100 V |
| --- | --- |
| $WO_3$ | 3% increase |
| ZnO | 9% increase |
| $TiO_2$ | 8% increase |
| $Fe_2O_3$ | 7% increase |

Table 1 shows off-rates of the quantum rod compounds according to the embodiment at a driving voltage of 100V when the content of the electron acceptors of the quantum rod compounds is between 1 to 10 wt % of the solute. In this example, metallic oxides 140 of $WO_3$, ZnO, $TiO_2$, and $Fe_2O_3$ are used as the electron acceptors of the quantum rod compounds.

In the quantum rod compound according to the embodiment, when the content of the electron acceptors is 1 to 10 wt %, the off-rate is rapidly increased while the same off voltage is applied. An increase in the off-rate of the quantum rod compound at a predetermined off voltage means that the quantum rod compound has the off-rate at the same level as the conventional quantum rod even if the off voltage is lowered in proportion to the amount of the increase in the off-rate. As a result, there is an effect of lowering the driving voltage.

In the quantum rod compounds according to the embodiment, when $WO_3$, ZnO, $TiO_2$, and $Fe_2O_3$ are used as the electron acceptors, the off-rates are increased in cases that the content of the electron acceptors is between 1 to 10 wt % of the solute.

It is noted that the off-rates do not vary because of the electron accumulation when the content of the electron acceptors is more than 10 wt %. In this case, since the off voltage cannot be lowered, there is no effect of improving the driving property.

Referring to Table 1, in the quantum rod compound where $WO_3$ is used as the electron acceptors and the content of the electron acceptors is 1 to 10 wt %, the off-rate is increased by about 3%. Alternatively, in the quantum rod compounds including ZnO, $TiO_2$, and $Fe_2O_3$ as the electron acceptors, when the contents of the electron acceptors are 1 to 10 wt %, the off-rates are increased by about 9%, 8%, and 7%, respectively.

In the quantum rod compound 100 according to the embodiment, each of the electron acceptors 160, which are attached to the surfaces of the quantum rods 130 or adjacent to the quantum rods 130, includes an organic ligand 150. The electron acceptor 160 is attached to the surface of the quantum rod 130 or is dispersed to be adjacent to and around the quantum rod 130 in the solute due to the organic ligand 150.

When a voltage is applied to the quantum rod 130 and an electron in the core 110 leaves the core 110, the electron acceptor 160 accepts the electron leaving the core 110 and accommodates the electron therein.

If the electron acceptor 160 is connected to the quantum rod 160 through the organic ligand 150, the electron leaving the core 110 directly moves into the connected electron acceptor 160 and is accommodated. If the electron acceptor 160 is adjacent to the quantum rod 130, the electron leaving the core 110 moves into the electron acceptor 160 through a medium of the solvent 170 and is accommodated.

The electron acceptor 160 may be formed of a metallic oxide 140, which has a relatively low energy level. The metallic oxide 140 may be ZnO, $TiO_2$, $WO_3$, or $Fe_2O_3$.

The electron acceptor 160 may include the organic ligand 150 at its surface to allow the electron acceptor 160 to easily combine with the quantum rod 130 and to be dispersed around the quantum rod 130.

The organic ligand 150 may have alkyl trimethoxy silane as a basic structure.

The alkyl may have a structure of $C_nH_{n+1}$, and beneficially, n is 3 to 20. It is noted that if the number of carbons atoms is less than 3 or more than 20, the dispersion property of the electron acceptor 160 is lowered and processability is decreased when the electron acceptor 160 is synthesized with the quantum rod 130. In this case, it is difficult to improve the properties of the quantum rod compound 100, that is, to increase the quantum yield and to improve the on/off driving property.

Accordingly, as stated above, it is desirable that n is between 3 to 20 to form the quantum rod compound 100 having excellent properties.

Figure 5:
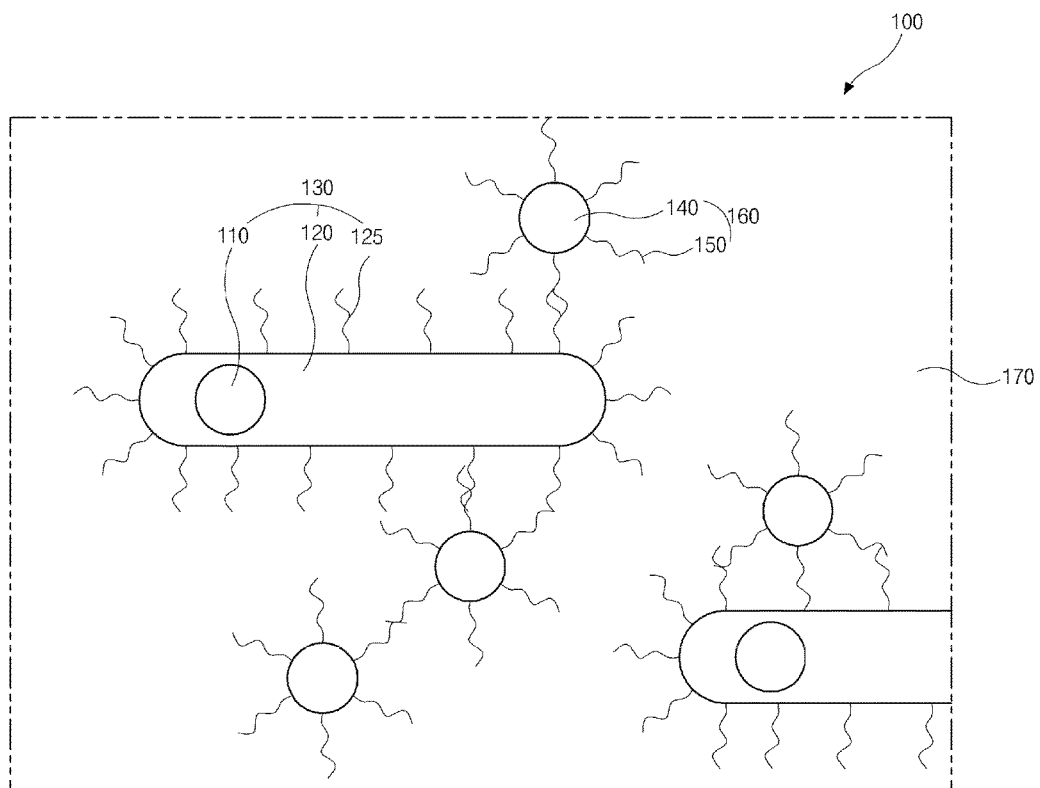
FIG. 5 is a view schematically illustrating a quantum rod compound according to another example of the exemplary embodiment of the invention.

As described, in the quantum rod compound 100 according to the embodiment, the electron acceptor 160 may include the organic ligand 150 at its surface. Alternatively, as shown in FIG. 5, which is a view schematically illustrating a quantum rod compound according to another example of the embodiment, the quantum rod 130 may include an organic ligand 125 at its surface to improve dispersion force.

The organic ligand 125 at the surface of the quantum rod 130 may not be limited to alkyl trimethoxy silane like the organic ligand 150 of the electron acceptor 160 and may be a fat-soluble organic ligand, water-soluble organic ligand, or silicon organic ligand.

Referring to FIG. 4 again, because the quantum rod compound 100 according to the embodiment has excellent quantum yield, the brightness is high when light with a specific wavelength range is incident without applying a voltage. Furthermore, the quantum rod compound 100 emits red, green, or blue light according to the length of the major axis of the quantum rod 130.

Figure 6:
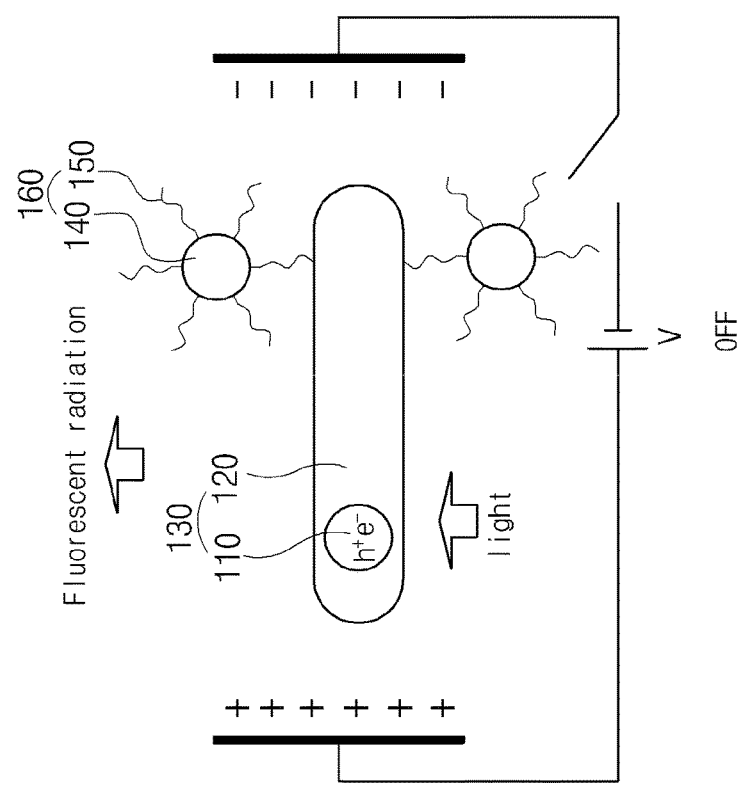
FIG. 6 is a view illustrating luminous characteristics of a quantum rod compound according to the exemplary embodiment of the invention when a voltage is not applied and is applied.
Figure 6:
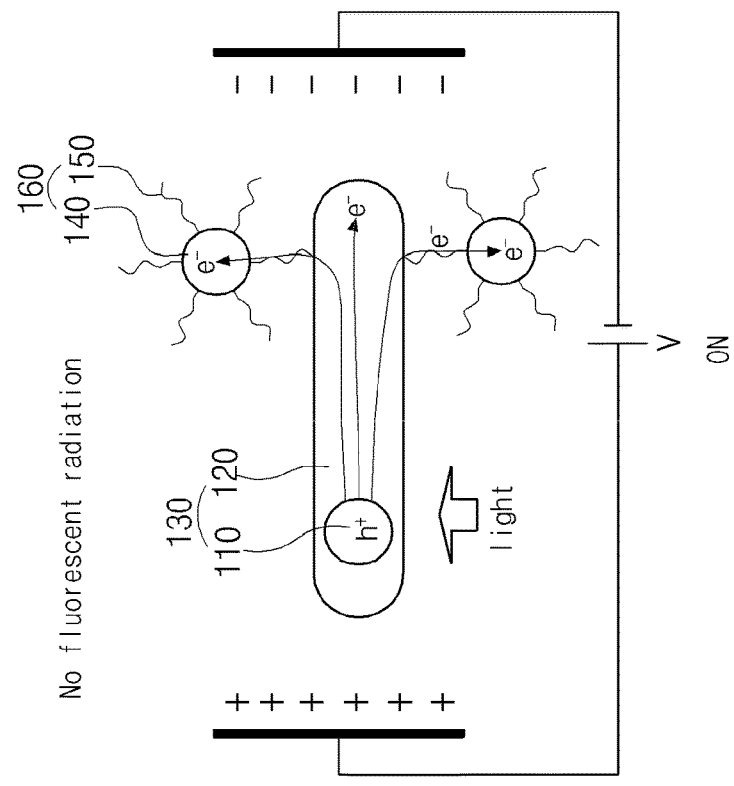

FIG. 6 is a view illustrating luminous characteristics of a quantum rod compound 100 according to an exemplary embodiment when a voltage (or an electric field) is not applied and when a voltage is applied. When a voltage is applied, an electron e– in the core 110 of the quantum rod 130 leaves the core 110 and moves into and stays in the shell 120 or the electron acceptor 160 around the shell 120.

In this instance, since the electron e– leaving the core 110 can be accommodated by the electron acceptor 160 in addition to the shell 120, although the shell 120 has a shorter length than the shell 20 of the quantum rod 30 of FIG. 2, a distance of the electron e– from the hole h+ in the core 110 of the quantum rod 130 in the quantum rod compound 100 according to the embodiment of the invention is the same as or similar to that of the quantum rod 30 of FIG. 2 including the relatively longer shell 20.

Namely, when the core 110 of the quantum rod 130 has the same size as the core 10 of the quantum rod 30 of FIG. 2, the length of the shell 20 of the quantum rod 30 of FIG. 2 may be referred to as a first length, and the length of the shell 120 of the quantum rod 130 may be referred to as a second length, which is shorter than the first length. Since the quantum rod 130 of the quantum rod compound 100 according to the embodiment of the invention includes the shell 120 having the second length shorter than the first length of the shell 20 of the quantum rod 30 of FIG. 2, the quantum rod 130 has a higher quantum yield than the quantum rod 30 of FIG. 2. In addition, although the second length of the shell 120 is shorter than the first length of the shell 20 of FIG. 2, the electron acceptor 160 accommodates the electron e– leaving the core 110 instead of the shell 120, and a distance of the electron e– from the hole h+ in the core 110 of the quantum rod 130 is the same as or similar to that of the quantum rod 30 of FIG. 2. Therefore, the quantum rod 130 has the on/off driving property same as or similar to the quantum rod 30 of FIG. 2.

Accordingly, the quantum rod compound 100 according to the embodiment of the invention improves the quantum yield and the on/off driving property together.

Hereinafter, a method of forming the quantum rod compound 100 according to an exemplary embodiment of the invention will be described.

Method of Forming Quantum Rod

The quantum rod of the quantum rod compound according to the embodiment of the invention may be formed by various methods according to materials of the core and shell.

For example, a method of forming a quantum rod which includes a core of ZnSe and a shell of ZnS will be explained.

Zinc sulfate (ZnS04) 150 mg, sulfur (S) powder 44 mg, and zinc selenide (ZnSe) particles 10 mg were dissolved in toluene 1 ml, were dried at about 120 degrees of Celsius for about 1 hour, and were stirred under nitrogen atmosphere at about 120 degrees of Celsius for about 3 hours, thereby forming a mixture.

Then, the mixture was put in a hydrothermal reactor containing oleylamine 17 ml and reacted at about 200 degrees of Celsius for about 24 hours, thereby forming a reactant. The reactant was precipitated using hexane and methanol and was refined, thereby synthesizing a quantum rod including a core of ZnSe and a shell of ZnS.

Method of Forming Electron Acceptor

Metallic oxide powder of one of ZnO, $TiO_2$, $WO_3$, and $Fe_2O_3$, for example, was stirred at about 60 degrees of Celsius for about 24 hours using alkyl trimethoxy silane as a coupling solvent, thereby forming a mixture.

Then, the mixture was mixed with methanol, and an electron acceptor, which is formed of ZnO, $TiO_2$, $WO_3$, or $Fe_2O_3$ and includes an organic ligand of alkyl trimethoxy silane, was formed using centrifugation.

Method of Synthesizing Quantum Rod and Electron Acceptor (Method of Forming Quantum Rod Compound)

The quantum rods and the electron acceptors, which were formed by the above-mentioned methods and serve as a solute, were mixed with a solvent, for example, toluene, and a quantum rod compound according to the embodiment of the invention was formed in which the content of the solute is 9 to 11 wt %.

Also, the quantum rod compound was formed by controlling the contents of the quantum rods and the electron acceptors such that the content of the electron acceptors is 1 to 10 wt % of the solute.

The stiffing process for forming the quantum rod or the electron acceptor is performed to smoothly blend or to appropriately react the mixture or the compound. In other embodiments, the stirring process may be omitted.

Moreover, the hydrothermal reactor provides an airtight reaction space and accelerates the reaction of the compound or improves the solubility of the compound. Temperatures and pressures in the hydrothermal reactor can be controlled.

Hereafter, a quantum rod luminescent display device according to an exemplary embodiment of the invention, which includes quantum rod compounds formed the above-described method, will be described.

Figure 7:
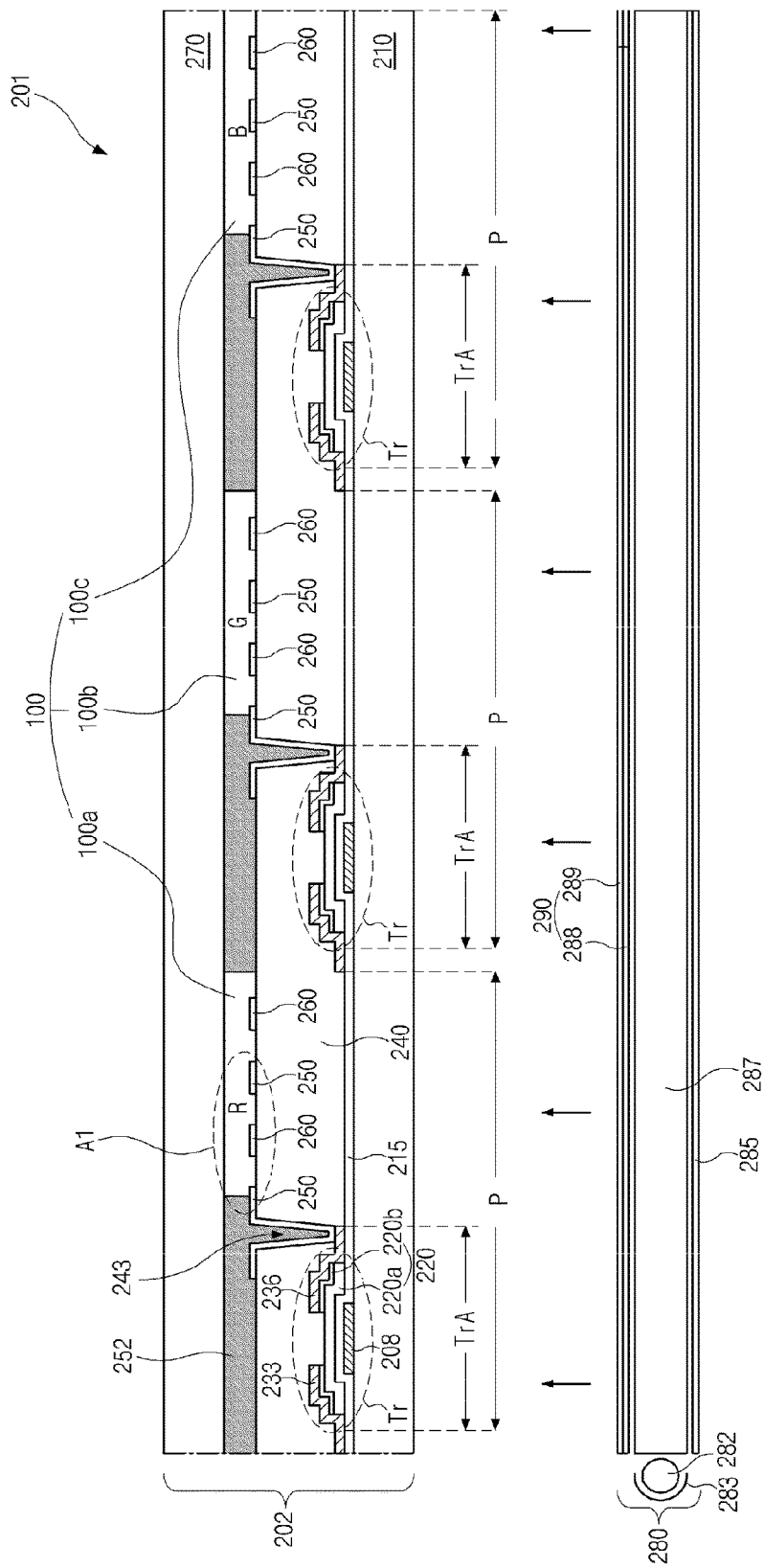
FIG. 7 is a cross-sectional view of a quantum rod luminescent display device according to an exemplary embodiment of the invention.

FIG. 7 is a cross-sectional view of a quantum rod luminescent display device according to an exemplary embodiment of the invention. FIG. 7 illustrates three adjacent pixel regions P, and a thin film transistor Tr is illustrated in each of the pixel regions P. Also, a region including the thin film transistor Tr in each of the pixel regions P is defined as a switching region TrA.

The quantum rod luminescent display device 201 according to an embodiment includes a quantum rod panel 202 and a backlight unit 280. The quantum rod panel 202 includes a first substrate 210 and a second substrate 270 opposite to each other. On the first substrate 210, first electrodes 250 are divided into the respective Red (R), Green (G), and Blue (B) pixel regions P. Second electrodes 260 adjacent to the first electrodes 250 are formed in each of the pixel regions P configured to display an image. A quantum rod compound layer 100 is interposed between the first and second electrodes 250 and 260.

In the quantum rod light-emitting display device 201 according to the embodiment, light emitted by the backlight unit 280 is absorbed by the quantum rod compound layer 100 so that electrons and holes can recombine to generate fluorescent light.

An intensity of an electric field generated between the first and second electrodes 250 and 260 may be varied by changing a voltage applied to the first and second electrodes 250 and 260, respectively, affecting the quantum rod compound layer 100. Thus, the quantum rod luminescent display device 201 displays gray levels by controlling a rate of recombination of electrons and holes in a plurality of quantum rods 130 included in the quantum rod compound layer 100. Also, quantum rods 130 of the quantum rod compound layer 100 may be formed to have different sizes in the respective pixel regions P, thereby generating red (R), green (G), and blue (B) light. Therefore, the quantum rod luminescent display device 201 may provide a full color range and display full-color images.

Hereinafter, construction of the first substrate 210 including the first and second electrodes 250 and 260 and the quantum rod compound layer 100 will be described.

The first substrate 210 may be a transparent insulating substrate, for example, a glass substrate or a flexible plastic substrate.

Gate lines (not shown) may be formed on the first substrate 210 and extend in a first direction. The gate lines may be formed of a metallic material having a relatively low resistivity, for example, one selected from aluminum (Al), an aluminum alloy (e.g., aluminum neodymium (AlNd)), copper (Cu), a copper alloy, molybdenum (Mo), and a molybdenum alloy (e.g., molybdenum titanium (MoTi)), or a combination thereof.

Also, a gate electrode 208 may be formed in the switching region TrA as part of each TFT (Tr) of each of the pixel regions P on the first substrate 210 and connected to one of the gate lines.

A gate insulating layer 215 may be formed on a substantially entire surface of the first substrate 210 including the gate lines and the gate electrode 208. The gate insulating layer 215 may be formed of an inorganic insulating material, for example, silicon oxide ($SiO_2$) or silicon nitride (SiNx).

A semiconductor layer 220 may be formed in the switching region TrA on the gate insulating layer 215 and corresponds to the gate electrode 208. The semiconductor layer 220 includes an active layer 220a of intrinsic amorphous silicon and ohmic contact layers 220b of impurity-doped amorphous silicon. The ohmic contact layers 220b are disposed on the active layer 220a and spaced apart from each other. Source and drain electrodes 233 and 236 are formed on the semiconductor layer 220 and spaced apart from each other. The source and drain electrodes 233 and 236 contact the ohmic contact layers 220b, respectively.

In this instance, the active layer 220a is exposed between the source and drain electrodes 233 and 236.

The gate electrode 208, the gate insulating layer 215, the semiconductor layer 220, and the source and drain electrodes 233 and 236, which are sequentially stacked in the switching region TrA, constitute a thin film transistor Tr.

Data lines (not shown) may be formed on the gate insulating layer 215 and extend in a second direction. The data lines cross the gate lines to define the pixel regions P. One of the data lines may be connected to the source electrode 233 of the thin film transistor Tr.

Meanwhile, although it is illustrated by example that the thin film transistor Tr is a bottom-gate-type transistor including the semiconductor layer 220 having the active layer 220a and the ohmic contact layers 220b of amorphous silicon and the gate electrode 208 disposed in the lowest position, in other embodiments of the invention, the thin film transistor Tr may be a top-gate-type transistor, which includes a semiconductor layer formed of polycrystalline silicon (poly-Si) and has a structure formed by sequentially stacking the poly-Si semiconductor layer, a gate insulating layer, a gate electrode, an interlayer insulating layer, and source and drain electrodes spaced apart from each other in contact with the poly-Si semiconductor layer. When a top-gate-type thin film transistor is included, a gate line may be provided on a gate insulating layer on which a gate electrode is formed, and a data line may be provided on an interlayer insulating layer.

A passivation layer 240 may be formed on the data lines and the source and drain electrodes 233 and 236. In this instance, a drain contact hole 243 is formed in the passivation layer 240 to expose the drain electrode 236 of the thin film transistor Tr in each of the pixel regions P.

First electrodes 250 are formed of a transparent conductive material on the passivation layer 240. Each of the first electrodes 250 is in contact with the drain electrode 236 of the thin film transistor Tr through the drain contact hole 243 in the corresponding one of the pixel regions P.

Second electrodes 260 are also formed of a transparent conductive material on the passivation layer 240. Each of the second electrodes 260 is in contact with a common line (not shown). The first electrodes 250 and second electrodes 260 are alternately arranged in each pixel region P. A voltage potential is applied between the first electrode 250 and the second electrode 260 to provide a varying electrical field to the quantum rod layer 100.

A black matrix 252 may be formed to correspond to the interfaces between the pixel regions P and the switching regions TrA in which the thin film transistors Tr are formed. The black matrix 252 may be used to shield the plurality of TFTs from unwanted incident light. In other embodiments of the invention, the black matrix 252 may be omitted.

The quantum rod compound layer 100 may be formed on the first electrode 250 and the second electrode 260 in each of the pixel regions P. The quantum rod compound layer 100 includes quantum rods 130, electron acceptors 160 and a solvent 170. The quantum rods 130 and the electron acceptors 160 form a solute, and the solute is dispersed in the solvent 170. The electron acceptors 160 are attached to the quantum rods 130, and more precisely, to surfaces of the shells 120 of the quantum rods 130 or adjacent to the quantum rods 130. At this time, the quantum rods 130 of the quantum rod compound layers 100 include cores 110 with different sizes in the respective pixel regions P configured to emit red, green, and blue light.

In addition, the plurality of quantum rods 130 included in the quantum rod compound layers 100 have major axes arranged in one direction all over the display region of the first substrate 210.

Arranging the major axes of the quantum rods 130 in one direction is to improve the brightness of the device by better absorbing light from the backlight unit 280 and emitting more fluorescent radiation. Furthermore, this is to lower the power consumption in addition to increasing the brightness.

When the quantum rods 130 having the cores 110 with different sizes are provided in the respective pixel regions P configured to emit red, green, and blue light, as the wavelength of light fluoresced by the quantum rods 130 varies according to the size of the cores 110. That is, the quantum rods 130 generate fluorescent light having a shorter wavelength with a reduction in the size of the cores 110 and generate fluorescent light having a longer wavelength with an increase in the size of the cores 110.

Accordingly, the quantum rod compound layer 100a corresponding to the pixel region P configured to emit red light includes the quantum rods 130 with the largest sized cores 110, and the quantum rod compound layers 100b and 100c corresponding to the pixel regions P configured to respectively emit green and blue light include the quantum rods 130 with sequentially smaller sized cores 110 than the largest sized cores 110.

A second substrate 270 is combined with the first substrate 210. Like the first substrate 210, the second substrate 270 may be a transparent insulating substrate formed of a glass material or a plastic material having flexibility. Alternatively, the second substrate 270 may be a sheet or film formed of a polymer.

An overcoat layer (not shown) having a flat surface may be provided on a substantially entire surface of the second substrate 270.

The backlight unit 280 configured to supply light to the quantum rod compound layer 100 may be under the quantum rod panel 202, more precisely, on an outer surface of the first substrate 210.

The backlight unit 280 may include a light source 282, a light source reflector 283, a reflection plate 285, a light guide plate 287 over the reflection plate 285, and optical sheets 290 over the light guide plate 287.

In the embodiment of the invention, the light source 282 generates light having a short wavelength range of less than about 450 nm, for example, blue visible light or UV light. The light source 282 may include one selected from a fluorescent lamp comprising a cold cathode fluorescent lamp (CCFL) and an external electrode fluorescent lamp (EEFL) or a light emitting diode (LED). In the embodiment, the light source 282 is illustrated as having a fluorescent lamp, for example.

The light source 282 is disposed at one side of the light guide plate 287 and faces a light incidence portion of the light guide plate 287. The light guide plate 287 totally reflects light incident from the light source 282 internally several times so that the light travels and uniformly spreads onto a surface of the light guide plate 287. Thus, the light guide plate 287 provides a surface light source to the quantum rod panel 202.

In this instance, patterns having a specific shape may be formed at a rear surface of the light guide plate 287 to supply a uniform surface light source to the quantum rod panel 202.

In addition, the reflection plate 285 is disposed on the rear surface of the light guide plate 287 and reflects light transmitted through the rear surface of the light guide plate 287 towards the quantum rod panel 202 to improve the brightness.

The optical sheets 290 over the light guide plate 287 include a diffusion sheet 288 and at least one light concentrating sheet 289.

Here, the embodiment illustrates that the backlight unit 280 having the above-described construction is an edge-type backlight unit in which the light source 282 is provided at a side surface of the light guide plate 287, and the light guide plate 287 allows surface light to be incident to the quantum rod panel 202. Alternatively, the backlight unit 280 may be a direct-type backlight unit.

In a direct-type backlight unit, a plurality of fluorescent lamps serving as light sources are disposed over a reflection plate at regular intervals, or an LED driving board on which a plurality of LEDs are mounted may be used. Also, a diffusion plate may be provided instead of the light guide plate 287 over the fluorescent lamps or the LED driving board, with optical sheets over the diffusion plate.

Figure 8:
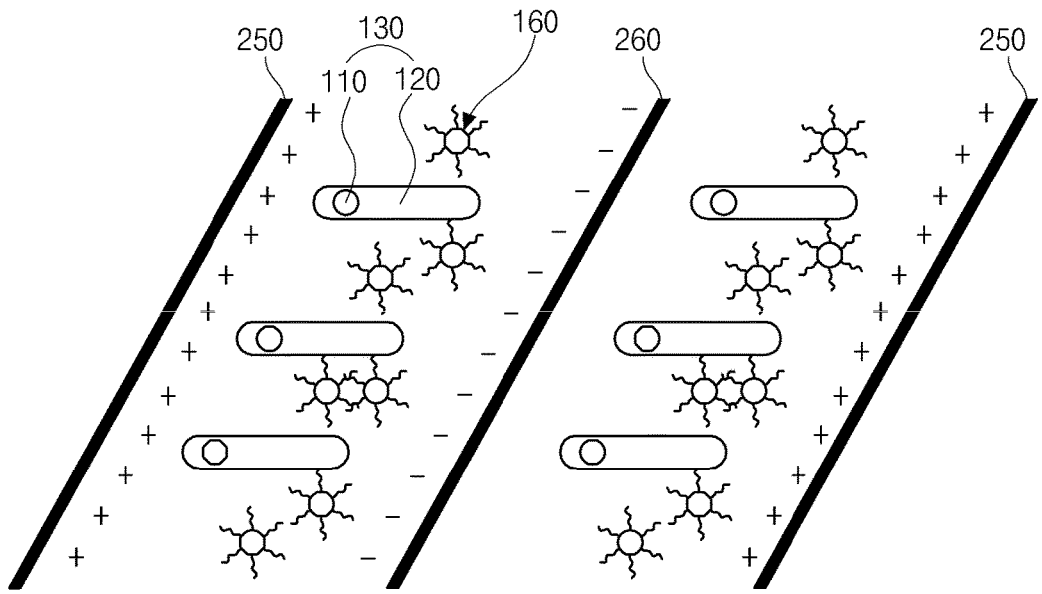
FIG. 8 is view illustrating operation of a quantum rod luminescent display device with a quantum rod compound according to an exemplary embodiment of the invention.

FIG. 8 illustrates operation of a quantum rod luminescent display device with a quantum rod compound layer 100 shown in FIG. 7. As illustrated, the quantum rods 130 are affected by an electric field generated between the first electrode 250 and the second electrode 260. As an example, the first electrode 250 is driven with a positive voltage with respect to the second electrode 260. The second electrode 260 is driven negatively with respect to the first electrode 250.

In this example, the quantum rod compound layer 100 is similar to that disclosed with respect to FIG. 4. The quantum rod 130 includes a core 110 and a shell 120. Electron acceptors 160 are both attached to and adjacent to the quantum rods 130.

Figure 9:
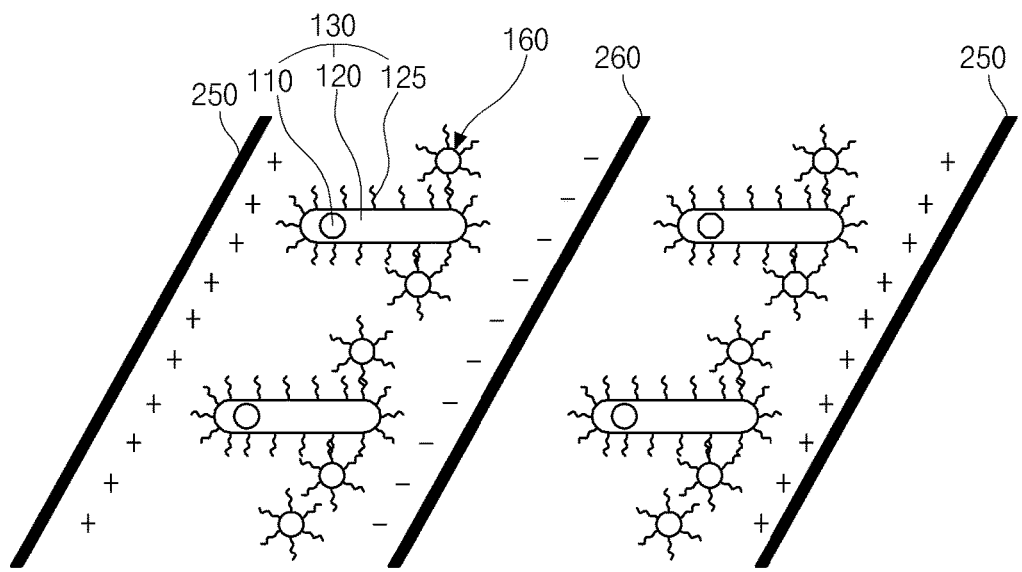
FIG. 9 is view illustrating operation of a quantum rod luminescent display device with a quantum rod compound according to another exemplary embodiment of the invention.

FIG. 9 illustrates operation of a quantum rod luminescent display device with a quantum rod compound layer 100 according to another exemplary embodiment of the invention. As exemplified in FIG. 8, the first electrode 250 and the second electrode 250 generate an electric field to affect the quantum compound layer 100.

Here, the quantum rod compound layer 100 is similar to that disclosed with respect to FIG. 5. The quantum rod 130 includes a core 110, a shell 120, and an organic ligand 125 at the surface of the quantum rod 130. Electron acceptors 160 are both attached to and adjacent to the quantum rods 130.

Because a polarizer transmitting only a portion of the incident light is not necessary, the quantum rod luminescent display device 201 according to the embodiment has higher brightness and lower power consumption than a corresponding liquid crystal display device in which the brightness is lowered because of the polarizers.

Moreover, because the quantum rod luminescent display device 201 according to the embodiment of the invention does not require polarizers, the number of the components is reduced as compared with the liquid crystal display device, and the manufacturing costs are decreased.

Furthermore, in the quantum rod luminescent display device 201 including the quantum rod compound layer 100 with the electron acceptors 160 according to the embodiment, the quantum rods 130 of the quantum rod compound layer 100 are arranged in one direction. Thus, light from the backlight unit 280 is better absorbed, and more fluorescent radiation is emitted, thereby further improving the brightness.

Additionally, in the quantum rod luminescent display device 201 including the quantum rod compound layer 100 with the electron acceptors 160 according to the embodiment, the driving voltage is lowered due to interaction between the electron acceptors 160 and the quantum rods 130 in the quantum rod compound layer 100, and the on/off driving property is improved simultaneously with improving the quantum yield. Therefore, the color purity is increased.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A quantum rod compound comprising:
   a quantum rod with a core and a shell surrounding the core, wherein the shell has a first length; and
   an electron acceptor attached to a surface of the quantum rod or adjacent to the quantum rod,
   wherein when a voltage is applied, an electron leaving the core is accommodated by the electron acceptor, and a distance of the electron from a hole in the core is same as or similar to that of a quantum rod including a shell having a second length, wherein the first length is shorter than the second length,
   wherein the electron acceptor includes an organic ligand at a surface,
   wherein the electron acceptor includes a metallic oxide selected from a group consisting of $WO_3$, $ZnO$, $TiO_2$, and $Fe_2O_3$, and
   wherein the organic ligand is an alkyl trimethoxy silane.

2. The compound according to claim 1, wherein alkyl of the alkyl trimethoxy silane has a structure of $C_nH_{n+1}$, where n is 3 to 20.

3. The compound according to claim 1, wherein the quantum rod and the electrode acceptor of the quantum rod serve as a solute, and
   wherein a content of the solute is 9 to 11 wt %.

4. The compound according to claim 3, wherein a content of the electron acceptor in the solute is 1 to 10 wt %.

5. The compound according to claim 1, wherein an aspect ratio of a major axis to a minor axis of the quantum rod is 8 to 12.

6. The compound according to claim 1, wherein the quantum rod includes an organic ligand at a surface, and
   wherein the organic ligand is one of a fat-soluble organic ligand, water-soluble organic ligand, and silicon organic ligand.

7. A quantum rod compound comprising:
   a quantum rod with a core and a shell surrounding the core; and
   an electron acceptor attached to a surface of the quantum rod or adjacent to the quantum rod,
   wherein the electron acceptor includes a metallic oxide and at least one organic ligand, and the at least one organic ligand connects the metallic oxide and the quantum rod,
   wherein the metallic oxide is selected from a group consisting of $WO_3$, $ZnO$, $TiO_2$, and $Fe_2O_3$, and
   wherein the organic ligand is an alkyl trimethoxy silane.

8. The compound according to claim 7, wherein alkyl of the alkyl trimethoxy silane has a structure of $C_nH_{n+1}$, where n is 3 to 20.

* * * * *